United States Patent [19]

Rahn

[11] Patent Number: 5,764,416
[45] Date of Patent: Jun. 9, 1998

[54] FAULT TOLERANT ANTIREFLECTIVE COATINGS

[75] Inventor: John P. Rahn, West Hills, Calif.

[73] Assignee: Litton Systems, Inc., Woodland Hills, Calif.

[21] Appl. No.: 584,334

[22] Filed: Jan. 11, 1996

Related U.S. Application Data

[63] Continuation-in-part of Ser. No. 821,274, Oct. 1, 1992, Pat. No. 5,483,378, which is a continuation of Ser. No. 530,675, May 30, 1990, abandoned, which is a continuation-in-part of Ser. No. 183,569, Apr. 19, 1988, Pat. No. 4,966,437.

[51] Int. Cl.$^6$ .............................. G02B 1/10; B05D 5/06
[52] U.S. Cl. .................. 359/586; 359/588; 359/589; 359/900; 427/10; 427/162; 427/166; 216/24; 216/52; 216/60; 216/65; 216/75; 216/79
[58] Field of Search ........................... 359/900, 580, 359/585, 586, 587, 588, 589; 427/10, 162, 164, 165, 166; 156/654.1, 655.1, 656.1; 216/24, 52, 60, 62, 65, 72, 75, 76, 79, 85, 95, 100, 101, 102

[56] References Cited

U.S. PATENT DOCUMENTS

| | | | |
|---|---|---|---|
| 3,185,020 | 5/1965 | Thelen | 359/586 |
| 3,423,147 | 1/1969 | Thelen | 359/588 |
| 3,914,023 | 10/1975 | Thelen | 359/588 |
| 4,195,908 | 4/1980 | Kestigian et al. | 350/151 |
| 4,264,133 | 4/1981 | Sakurai | 359/586 |
| 4,370,027 | 1/1983 | Sato et al. | 359/588 |
| 4,583,822 | 4/1986 | Southwell | 350/164 |
| 4,666,250 | 5/1987 | Southwell | 350/166 |
| 4,701,663 | 10/1987 | Kawakatsu et al. | 313/112 |
| 4,725,109 | 2/1988 | Wank et al. | 350/1.6 |
| 4,778,251 | 10/1988 | Hall et al. | 350/166 |
| 4,966,437 | 10/1990 | Rahn | 355/166 |
| 5,483,378 | 1/1996 | Rahn | 359/586 |

FOREIGN PATENT DOCUMENTS 2020842  4/1979  United Kingdom.

OTHER PUBLICATIONS

"Interference Coatings–Practical Considerations" by D. Harrison, vol. 50; *Proceedings of the Society of Photo-Optical Instrumentation Engineers* (SPIE); Aug. 1974, pp. 1–28.

"Coating design using very thin high–and low–index layers" by W. Southwell, vol. 24, No. 4, *Applied Optics*; Feb. 15, 1985, pp. 457–460.

*Primary Examiner*—Ricky D. Shafer
*Attorney, Agent, or Firm*—Lynn & Lynn

[57] ABSTRACT

A narrow-band antireflective coating is comprised of a multilayer dielectric film formed on a dielectric substrate. The antireflective coating is initially formed so that its outer layer has a thickness greater than the thickness required for antireflection. The reflectivity is monitored while outer layer is reduced in thickness to reduce the thickness of the outer layer to reduce the reflectivity.

6 Claims, 6 Drawing Sheets

FAULT TOLERANT ANTIREFLECTIVE COATINGS

CROSS REFERENCE TO RELATED APPLICATIONS

This is a continuation-in-part of applicant's U.S. patent application Ser. No. 08/821,274, filed Oct. 1, 1992, now U.S. Pat. No. 5,483,378, which is a continuation of U.S. patent application Ser. No. 07/530,675 filed May 30, 1990, now abandoned, which is a continuation-in-part of U.S. patent application Ser. No. 07/183,569, filed on Apr. 19, 1988, now U.S. Pat. No. 4,966,437 for FAULT-TOLERANT ANTI-REFLECTIVE COATINGS.

BACKGROUND OF THE INVENTION

This continuation-in-part of the inventor's above-referenced application is directed to antireflective multilayer coatings that comprise layers of three different dielectric materials. The theory of such coatings using simple phasor diagrams is explained after the description of FIG. 4, which is where the disclosure of the parent application ended. The physical concepts of the invention are set forth in the new matter added in this continuation-in-part.

In the field of electrooptics, a non-reflective coating is frequently needed on components that are in the path of a light beam of a selected wavelength. To reduce mode coupling and resonator losses in ring laser gyros having intracavity elements such as Faraday rotators, it is necessary to reduce reflections from such elements. Preferably reflections from the Faraday rotator intracavity element should be reduced to zero. In a rotation sensor, for example, the Faraday rotator may be fabricated of SF-57, a Schott glass with a high Verdet constant. A non-reflective or antireflective coating is deposited on the surfaces of the Faraday rotator. In designing an antireflective coating, one might specify both substrate and dielectric film materials having certain required indices of refraction, and such materials might be unavailable. There are very few low-loss coating materials and even fewer materials that are also sufficiently stable in the environment of a ring laser gyroscope.

A typical antireflective coating on the Faraday rotator to prevent reflections of laser beams back into the ring laser, may be a multilayer film dielectric of silica, $SiO_2$, and titania, $TiO_2$. The reflectivity of the multilayer film coating depends upon the thicknesses and the relative thicknesses of the two films. For a general discussion of the reflectivity of multilayer films see "Principles of Optics," fifth edition, by Max Born and Emil Wolf, Pergamon Press, 1975, pages 59 et. seq.

SUMMARY OF THE INVENTION

A plurality of films of interleaved low and high index of refraction materials such as a silica and titania pair, particularly if the total thickness of the multilayer film structure is kept below a predetermined value, may be made completely antireflective. Other combinations, for example, alumina and titania, alumina and hafnia, silica and hafnia, and silica and tantala may be used. Practically, however, when the films are fabricated on a substrate, the films are not exactly the correct thickness for the structure to be antireflective. To make them antireflective, a portion of the outer film is removed by a process such as chemical etching or milling.

The reflectivity of the multilayer film is extremely sensitive to the thickness of the material with the higher index of refraction. The reflectivity of the multilayer film is less sensitive to the thickness of the material with the lower index of refraction.

The present invention provides apparatus and method for making an antireflective coating using materials having a limited range of refractive indices. The present invention also provides means and method for making an antireflective surface suitable for use in a ring laser gyroscope.

An antireflective multilayer film according to the invention is formed on an optical substrate to comprise alternating layers of silica as a low refractive index material and a high refractive index material chosen from the group consisting of zirconia, tantala and hafnia, a single additional dielectric layer comprising a material chosen from the group consisting of alumina, tantala, hafnia, and titania, and an outermost layer of silica formed on the single additional dielectric layer, produced by a process that comprises the steps of determining an effective index of refraction for the multilayer film, the effective index of refraction having a reduced sensitivity to errors in thickness of the alternating layers and being correctable for the thickness errors by reducing the thickness of the outermost silica layer. The process further includes the steps of forming the antireflective multilayer film of more than two layers of the low and high refractive index material on the optical substrate, the layers having thickness ratios that provide the effective index of refraction and reduced sensitivity of the antireflective multilayer film with the outermost film of silica having a thickness greater than its required thickness for antireflectivity; and reducing the thickness of the outermost silica layer to compensate for total thickness error of both the outermost silica layer and the alternating layers of the multilayer film to reduce the reflectivity of the multilayer film.

An antireflective multilayer film according to the invention may also be formed on an optical substrate to comprise alternating layers of alumina as a low refractive index material and a high refractive index material chosen from the group consisting of titania, tantala, zirconia and hafnia and a single additional dielectric layer comprising a material chosen from the group consisting of silica, alumina, tantala, zirconia, hafnia, and titania, and an outermost layer of alumina formed on the single additional dielectric layer, produced by a process that comprises the steps of determining an effective index of refraction for the multilayer film, the effective index of refraction having a reduced sensitivity to errors in thickness of the alternating layers and being correctable for the thickness errors by reducing the thickness of the outermost alumina layer. The process further includes the steps of forming the antireflective multilayer film of more than two layers of the low and high refractive index material on the optical substrate, the layers having thickness ratios that provide the effective index of refraction and reduced sensitivity of the antireflective multilayer film with the outermost film of alumina having a thickness greater than its required thickness for antireflectivity; and reducing the thickness of the outermost alumina layer to compensate for total thickness error of both the outermost alumina layer and the alternating layers of the multilayer film to reduce the reflectivity of the multilayer film.

The high refractive index material and the single additional outermost dielectric layer are preferably formed of different materials. The high refractive index material and the single additional outermost dielectric layer preferably are formed of different materials with the single additional outermost dielectric layer having a refractive index that is lower than the refractive index of the high refractive index material.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 2:
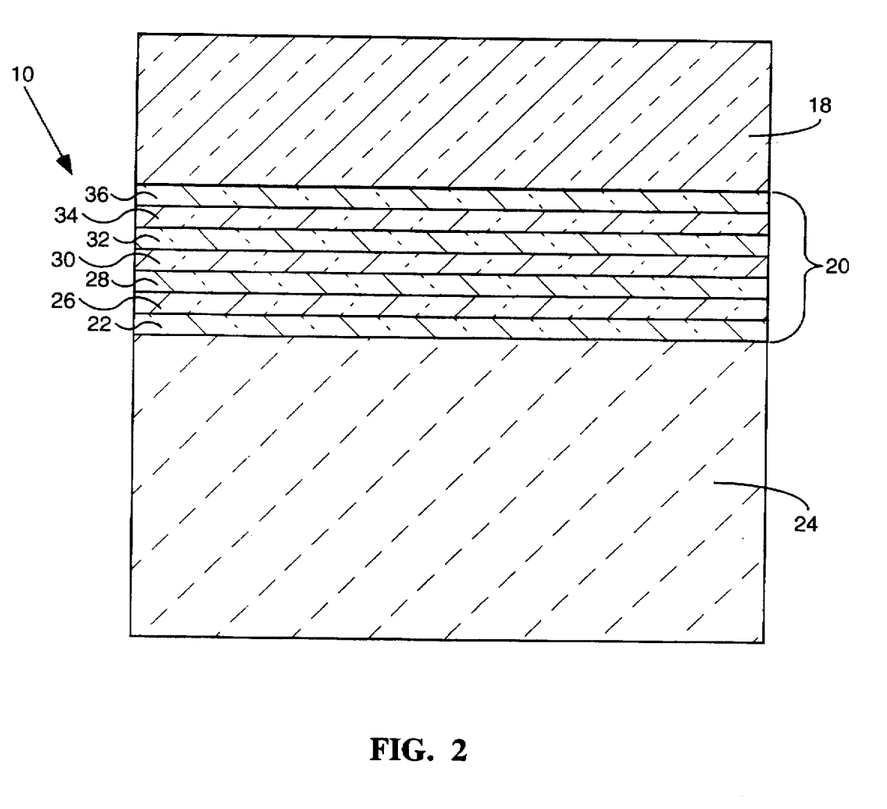
FIG. 2 shows a multilayer film with exaggerated dimensions and a thick outer film.

Referring to FIG. 2, a multilayer film structure 10 formed of a plurality of thin-film layers of interleaved low and high index of refraction material are formed on a substrate 24. The layers 22, 28, 32 and 36 are formed of the higher index material, and the layers 26, 30 and 34 are formed of the lower index material. The thicker outer layer 18 is also formed of a lower index material. A suitable material for the substrate is a lead glass by Schott known as SF 57. The basic requirement for the substrate 24 is stability over the anticipated operating temperature. The alternating layers may be silica (SiO$_2$) having a refractive index of 1.48 and titania (TiO$_2$) having a refractive index of 2.30. According to the present invention, the layers of the multilayer structure 10 have thicknesses such that the multilayer structure 10 is completely antireflective for a selected wavelength. Practically, however, when the films are fabricated on the substrate 24, available manufacturing processes for depositing the films do not produce exactly the correct thicknesses to cause the multilayer structure to be antireflective. To modify the multilayer structure 10 to be more nearly antireflective, a portion of the outer film 18 must be removed by chemical etching, milling or other suitable process. Reducing the thickness of the outer layer 18 can sometimes correct for errors in the thicknesses of the other layers in the multilayer structure 10.

Figure 5:
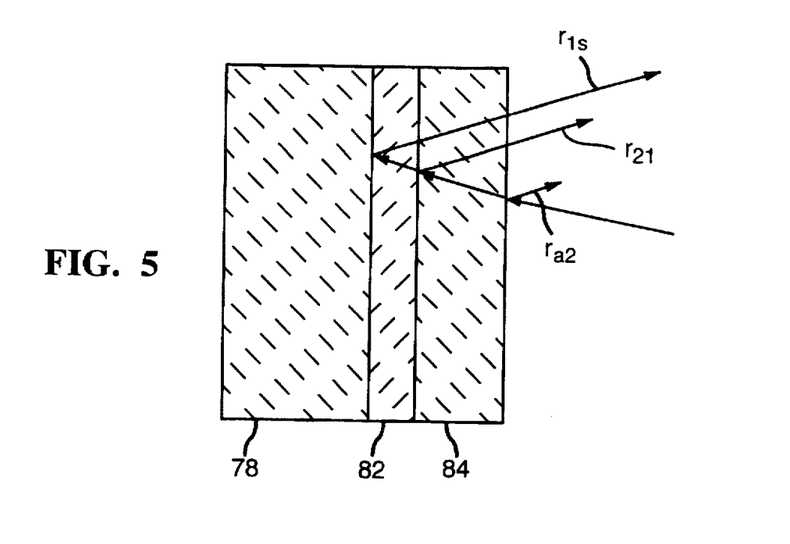
FIG. 5 illustrates a multilayer antireflective coating formed on a substrate.

The reflectivity of the multilayer film 10 is extremely sensitive to the thickness of the titania material with the higher index of refraction. The reflectivity of the multilayer film is less sensitive to the thickness of the silica material with the lower index of refraction. An almost perfect antireflective multilayer film 10 may be fabricated on SF-57 using only two films 82 and 84 on a substrate 78 as shown in FIG. 5. The inner film 82 is formed of the higher index of refraction material and the outer film 84 is formed of the lower index of refraction material. The outer film 84 is then milled or etched to a critical thickness that causes the multilayer film 10 to become almost completely antireflective.

Figure 1:
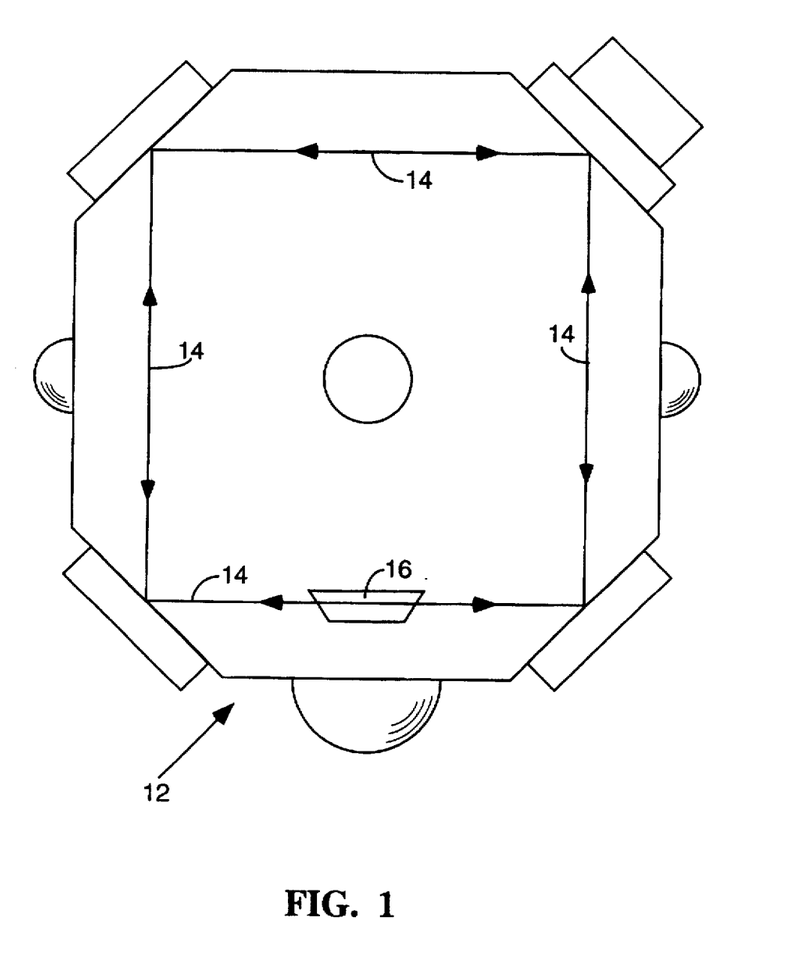
FIG. 1 is a schematic drawing of a ring laser rotation sensor showing a Faraday cell positioned therein and having antireflective coatings thereon.

Referring to FIG. 1, in a ring laser gyroscope 12, the laser beams 14 travel in both directions through an intracavity element 16, which is typically a Faraday Cell. It is essential that the arriving beams do not reflect because reflections introduce optical loss. Optical loss increases errors in the ring laser gyro output signal, thereby reducing the accuracy in measuring rotations.

If the incidence angle on the intracavity element 16 is less than ten degrees, the effect of differences of polarization on the performance of the anti-reflection coating is minimal. Thus, in ring laser gyroscopes, the antireflective coating of this invention operates equally well for both p and s polarizations.

The design of an antireflective surface film is typically optimum for neither polarized nor s-polarized beams. However, the antireflective film according to the invention is almost optimum for both polarizations. The difference in reflectivity of incident beams of the two polarizations is on the order of only ten parts per million for angles of incidence beams within ten degrees of the normal to the surface of the film.

In the following calculations, the absorptive loss index, k, has been neglected in computing the reflectivity, R. The absorptive loss index for the usual titania and silica films, and thus its inclusion in the Equations does not significantly affect the design of the antireflective multilayer films. However, if the absorptive loss index has a value that is as large as 2% of the real part of the index of refraction, n, the absorptive loss index must be considered in calculating the antireflective coating film thicknesses.

It has been found that film thickness errors in the range of +0.05 optical radians from the designed thickness for perfect antireflection, produce less than 250 parts per million reflection loss. The reasons for stating the film thickness in radians of phase shift instead of Angstroms is that the radian measure is independent of wavelength for a given set of indices of refraction. The physical thickness, $t_i$, of the "ith" film in Angstroms is:

$$t_i = \frac{t\lambda}{2\pi[n_i^2 - n_o^2\sin^2\theta_o]^{0.5}}, \qquad (1)$$

where $\lambda$ is the vacuum wavelength of the beam, $n_i$ is the index of refraction of the film, $n_o$ is the index of refraction of the contiguous medium, $\theta_o$ is the angle of incidence of the beams in that medium, and t is the thickness in optical phase units of radians.

It is instructive to design a single antireflective film which would be useful if a material of the proper index of refraction were available. Equation (2) determines the film index of refraction for perfect antireflection of an s-polarized beam. Equation (3) is for a p-polarized beam.

$$n_{1,s} = [n_o^2 \sin^2\theta_o + n_o n_s \cos\theta_o \cos\theta_s]^{0.5}. \qquad (2)$$

For s-polarization the index is:

$$n_{1,p} = \{n_o n_s / [2 \cos\theta_o \cos\theta_s]\}^{0.5} *$$
$$\{1 + [1 - 4n_o \sin^2\theta_o \cos\theta_o \cos\theta_s / n_s]^{0.5}\}^{0.5} \qquad (3)$$

The subscripts o and s refer to the parameters of the contiguous medium and the substrate, respectively, and where $\theta_o$ and $\theta_s$ are the propagation angles relative to the normal of the interface and $n_o$ and $n_s$ are the indices of refraction.

In general, materials with the correct index of refraction to satisfy Equations (2) and (3) are not available. When two films of different refractive index are used, both the real and imaginary parts of the complex reflection coefficient cannot be zero at the same time for a non-zero angle of incidence for any substrate for both s and p polarizations. For example, the substrate may be made antireflective to the s-polarized beam but not the polarized beam. Alteratively it may be made antireflective to the p beam but not the s beam. The required thicknesses $t_2$ and $t_1$ are determined from Equations (4) and (5) below:

$$t_2 = \tan^{-1}\left[\frac{(p_o - p_s)(p_1^2 - p_o p_s)p_2^2}{(p_2^2 p_o - p_1^2 p_s)(p_s p_o - p_2^2)}\right]^{0.5} \quad (4)$$

$$t_1 = \tan^{-1}\left[\frac{(\tan t_2)p_1(p_s p_o - p_2^2)}{p_2(p_1^2 - p_o p_s)}\right]^{0.5} \quad (5)$$

where:

$$p_i = n_i \cos\theta_i \quad (s\text{-polarized}) \text{ for } i = 1,2, \text{ and} \quad (6)$$

$$p_i = \frac{\cos\theta_i}{n_i} \quad (p\text{-polarized}) \text{ for } i = 1,2 \quad (7)$$

The numerical subscripts in Equations (6) and (7) refer to the film parameters with the lowest number referring to the film closest to the contiguous medium.

The requirements for zero reflectivity of both the p- and s-polarized beams are not simultaneously satisfied by two films. To design an antireflective multilayer film for circularly polarized light, one designs multilayer films for both s and p polarization and averages the film thicknesses between those required for s polarization and those required for p polarization. For incidence angles of less than ten degrees, both p and s polarizations will have nearly zero reflection.

The sensitivity of the reflectivity, R, to errors in thickness of the films may be computed. Because the reflectivity is a positive or zero number, it is expected that the slope of the reflectivity as a function of film thickness, index of refraction, angle of incidence, beam wavelength, substrate index of refraction, index of refraction of the contiguous medium at the proper film thickness, indices of refraction, angles of incidence, beam wavelengths, substrate index of refraction, and index of the contiguous medium will be zero. Therefore, the reflectivity may be expanded in a Taylor's series, keeping the first and second order terms as shown in Equation (8) below:

$$R = \frac{1}{2}\sum_{i,j}\left(\frac{\partial^2 R}{\partial t_i \partial t_j}\right)(t_i - t_{io})(t_j - t_{jo}), \quad (8)$$

where the sum is taken over the range, i=1, 2 and j=1, 2. The second derivative is evaluated at the designed thicknesses of the films. The thicknesses $t_1$ and $t_2$ and $t_{10}$ and $t_{20}$ are the ideal values of the film thicknesses. When there are m films, with m>2, in a multilayer film, the $t_i$ and $t_j$ terms are calculated over all of the values from 1 to m.

In a typical situation, only a few of the thicknesses will be in error. To determine the thickness error permitted to obtain 1000 parts per million reflectivity when only one of the actual thicknesses differs from its designed thickness, one substitutes numerals into Equation (8) and takes the partial derivative with respect to that particular thickness, using Equation (9).

$$t_i = \sqrt{\frac{0.002}{\frac{\partial^2 R}{\partial t_i^2}}} \quad (9)$$

Note that from Equation (8) the reflectivity is proportional to the square of the error in thickness so that if the thickness error is reduced by one-half, the reflectivity is reduced by one-quarter.

To determine the correction needed in the outer film to reduce the reflectivity caused by an error in thickness of an inner film, one must examine the mixed partial second derivative terms of Equation (8). The thickness of the outer film that produces a minimum reflectivity is the thickness at which the differential of the reflectivity with respect to the outer film thickness becomes zero. Equation (10) below is for that zero derivative when there are only two films in the multilayer film.

$$\frac{dR}{dt_1} = \frac{\partial^2 R}{\partial t_1^2}(t_1 - t_{10}) + \frac{\partial^2 R}{\partial t_1 \partial t_2}(t_2 - t_{20}) \quad (10)$$

The second derivatives are evaluated at the $(t_{10}, t_{20})$ coordinates where R=0. Solving Equation (10) for $(t_1 - t_{10})$ produces:

$$(t_1 - t_{10}) = -\frac{\frac{\partial^2 R}{\partial t_1 \partial t_2}}{\frac{\partial^2 R}{\partial t_1^2}}(t_2 - t_{20}). \quad (11)$$

Equation (11) gives the result in radians, which can be converted to Angstroms. The coefficient on the right side of Equation (11) is subsequently referred to as SHAV$_{12}$, which is the number of Angstroms that must be milled from the outer film (1) to correct for a one Angstrom surplus in the thickness of the inner film (2). If the error is negative, one must add to the outer film thickness to reduce the reflectivity. In practical terms, one always fabricates the outer film sufficiently thick that material must always be removed therefrom to adjust the reflectivity according to this invention. Similarly, in a three layer antireflective coating, SHAV$_{13}$ is the amount of thickness that must be removed from the outer film to correct for one Angstrom surplus in the thickness of the third film. All of the SHAV functions will be in the form SHAV$_{ij}$ which is the amount of thickness that must be removed from the outer film to correct for a one Angstrom surplus in the thickness of the "$j_{th}$" film.

It is useful to consider the design of a three-layer multilayer film. If the geometric mean of the indices of refraction of the materials in the multilayer film is higher than the index of refraction of the substrate, it is important to place the film 82 having the highest index of refraction next to the substrate 78 as shown in FIG. 5 and to use a film having the lowest index of refraction as the outer film 84.

To design a three layer, two material, multilayer film to produce a reflectivity less than 200 parts per million, one determines the first and second derivatives of reflectivity with respect to thickness of the films. One then substitutes the assumed thicknesses into the Equations and, using the first derivatives of reflectivity with respect to thickness as constants, the following Equations (12), (13), and (14) are solved simultaneously to obtain the corrections to be made to the assumed thicknesses of films 1, 2, and 3:

$$\frac{dR}{dt_1} = \frac{\partial^2 R}{\partial t_1^2}(t_1 - t_{10}) + \frac{\partial^2 R}{\partial t_1 \partial t_2}(t_2 - t_{20}) + \frac{\partial^2 R}{\partial t_1 \partial t_3}(t_3 - t_{30}), \quad (12)$$

-continued $$\frac{dR}{dt_2} = \frac{\partial^2 R}{\partial t_1 \partial t_2}(t_1-t_{10}) + \frac{\partial^2 R}{\partial t_2^2}(t_2-t_{20}) + \frac{\partial^2 R}{\partial t_2 \partial t_3}(t_3-t_{30}) \quad (13)$$

and $$\frac{dR}{dt_3} = \frac{\partial^2 R}{\partial t_1 \partial t_3}(t_1-t_{10}) + \frac{\partial^2 R}{\partial t_2 \partial t_3}(t_2-t_{20}) + \frac{\partial^2 R}{\partial t_3^2}(t_3-t_{30}) \quad (14)$$

where the "$t_{i0}$" are the design values of $t_i$ to reduce the reflectivity from its value at the manufactured thicknesses to zero.

Equations (12), (13) and (14) are solved simultaneously for $$\Delta t_i = t_i - t_{i0} \quad (15)$$

to obtain a new set of $t_1$, $t_2$, $t_3$ which give lower reflectivity than $t_{10}$, $t_{20}$, $t_{30}$. The new set of $t_1$, $t_2$, $t_3$ is used in the numerical design process wherein $SHAV_{13}$ and $SHAV_{12}$ are defined the same as for the two film $SHAV_{12}$, and the values for $t_i$ can be corrected using the expression $$t_{i0} = t_i - \Delta t_i \quad (16)$$

By repeated iterations, zero reflectivity is approached. After the reflectivity to a first polarization of light, (e.g. p-polarization) is reduced to the order of one part per million, both the tolerances to index of refraction and to the reflectivity to the other polarization (e.g. s-polarization) are determined.

To obtain a formula for an estimate of the reflectivity, when the actual errors in thicknesses and indices of refraction are known, one expands the reflectivity, R, in a Taylor series about zero:

$$R = \frac{\partial^2 R}{\partial t_1 \partial t_2}(\Delta t_1 \Delta t_2) + \frac{\partial^2 R}{\partial t_1^2} \frac{\Delta t_1^2}{2} + \frac{\partial^2 R}{\partial t_2^2} \frac{\Delta t_2^2}{2}. \quad (17)$$

To determine the sensitivity of the reflectivity to a small change, $\Delta t_1$ in $t_1$, taking the derivative of R in Equation (17) with respect to $\Delta t_1$ gives:

$$\frac{dR}{d(\Delta t_1)} = \frac{\partial^2 R}{\partial t_1 \partial t_2} \Delta t_2 + \frac{\partial^2 R}{\partial t_1^2} \Delta t_1. \quad (18)$$

To determine the required thickness change of $t_1$ for a minimum R, set Equation (18) equal to zero, and solve for $\Delta t_1$ to obtain:

$$t_{1R_{min}} = -\left\{ \frac{\frac{\partial^2 R}{\partial t_1 \partial t_2}}{\frac{\partial^2 R}{\partial t_1^2}} \right\} \Delta t_2. \quad (19)$$

The portion of Equation (19) within the braces { } is identically equal to $SHAV_{12}$, and therefore the required thickness change may be written as:

$$t_{1R_{min}} = -SHAV_{12}\Delta t_2. \quad (20)$$

Rewriting Equations (17) and (19 to simplify algebraic manipulation gives:

$$R = A\Delta t_1 \Delta t_2 + \frac{B\Delta t_1^2}{2} + \frac{C\Delta t_2^2}{2}, \quad (17A)$$

and $$t_{1R_{min}} = -\frac{A}{B} \Delta t_2 = -SHAV_{12}\Delta t_2. \quad (19A)$$

Substituting Equation (19A) into Equation (17A):

$$R = -\frac{A}{B} \Delta t_2^2 + \frac{BA^2 \Delta t_2^2}{2B^2} + \frac{C\Delta t_2^2}{2} \quad (17B)$$

Equation (17B) may be rearranged to obtain:

$$R = \frac{\Delta t_2^2}{2} \left\{ -2B\left(\frac{A^2}{B^2}\right) + B\left(\frac{A^2}{B^2}\right) + C \right\}, \quad (17C)$$

$$R = \frac{\Delta t_2^2}{2} \left\{ -B\left(\frac{A^2}{B^2}\right) + C \right\}, \quad (17D)$$

and $$R = \frac{\Delta t_2^2}{2} \{C - SHAV_{12}^2 B\}, \quad (17E)$$

which may be used to obtain $R_{min}$:

$$R_{min} = \left\{ \frac{\partial^2 R}{\partial t_2^2} - SHAV_{12}^2 \left(\frac{\partial^2 R}{\partial t_1^2}\right) \right\} \frac{\Delta t_2^2}{2}. \quad (21)$$

For a given amount of allowed reflectivity error, $R_j$, due to just one film thickness error, from Equation (17), the thickness tolerance for $R_j$ is $$t_j = \sqrt{\frac{2R_j}{\frac{\partial^2 R}{\partial t_j^2}}}. \quad (22)$$

In Table 1 below, $\Delta R$ is chosen as $\Delta R_j=0.001$ and the $\pm$values of the thickness tolerances corresponding to $R_j=0.001$ are:

$$TOL_2 = \sqrt{\frac{0.002}{\frac{\partial^2 R}{\partial t_2^2}}} \text{ Å} \quad (23A)$$

and $$TOL_1 = \sqrt{\frac{0.002}{\frac{\partial^2 R}{\partial t_1^2}}} \text{ Å}. \quad (23A)$$

Factoring $$\frac{\partial^2 R}{\partial t_2^2}$$

from Equation (21) we have $$R_{min} = \frac{\partial^2 R}{\partial t_2^2} \left\{ 1 - SHAV_{12}^2 \frac{\frac{\partial^2 R}{\partial t_1^2}}{\frac{\partial^2 R}{\partial t_2^2}} \right\} \frac{\Delta t_2^2}{2}. \quad (24)$$

Substituting $TOL_1$ and $TOL_2$ into Equations (24) and (24A) gives $$R_{min} = \frac{\Delta t_2^2}{TOL_2^2} \left\{ 1 - SHAV_{12}^2 \frac{TOL_2^2}{TOL_1^2} \right\} (1000) \text{ ppm/Å}^2. \quad (24A)$$

To design a two film antireflective apparatus, $TOL_2$ should be large, $TOL_1$ should be small, and $SHAV_{12}$ should be large so that the quantity in the braces of Equation (24A) is cancelled.

For a typical inner film of $TiO_2$, having $n_2=2.30\pm0.11$, and an outer film of $SiO_2$, having $n_1=1.48\pm0.05$, for various thicknesses, calculated as recited above, the reflectivity is very low, being on the order of fourteen to sixteen ppm.

The following Table 1 is presented for substrate refractive indices ranging from 1.50 to 2.00. The data in Table 1 was calculated using references and definitions from Born and Wolf, *PRINCIPLES OF OPTICS*, 5th Ed., Pergamon Press, London, 1975.

Equation (24B) is a sample calculation wherein $n_1=n_L=1.48$, $n_2=n_H=2.30$, $SHAV_2=0.25$, $TOL_1$, 52 Angstroms, $TOL_2=61$ Angstroms, and $n=1.84$.

$$\frac{R_{min}}{2} = 1000 \left(\frac{1}{61}\right)^2 \left\{ 1 - \left[ 0.05 \left(\frac{61}{52}\right) \right]^2 \right\} = 0.27 \frac{ppm}{2} \quad (24B)$$

TABLE 1

| $n_1 = n_L = 1.48\ (SiO_2)$ | | $n_H = n_2 = 2.30\ (TiO_2)$ | |
|---|---|---|---|
| Substrate refractive index | Thickness of outer film No. 1 ± $TOL_1$ | Thickness of inner film No. 2 ± $TOL_2$ | $SHAV_{12}$ |
| 1.50 | 1441 ± 52 | 200 ± 31 | 0.49 |
| 1.52 | 1429 ± 52 | 204 ± 32 | 0.45 |
| 1.54 | 1416 ± 52 | 207 ± 33 | 0.42 |
| 1.56 | 1404 ± 52 | 210 ± 34 | 0.38 |
| 1.58 | 1393 ± 52 | 213 ± 36 | 0.35 |
| 1.60 | 1381 ± 52 | 215 ± 37 | 0.32 |
| 1.62 | 1370 ± 52 | 218 ± 38 | 0.29 |
| 1.64 | 1359 ± 52 | 221 ± 40 | 0.26 |
| 1.66 | 1348 ± 52 | 223 ± 41 | 0.24 |
| 1.68 | 1337 ± 52 | 225 ± 43 | 0.21 |
| 1.70 | 1327 ± 52 | 227 ± 45 | 0.19 |
| 1.72 | 1317 ± 52 | 229 ± 47 | 0.17 |
| 1.74 | 1307 ± 52 | 231 ± 49 | 0.14 |
| 1.76 | 1297 ± 52 | 233 ± 51 | 0.12 |
| 1.78 | 1287 ± 52 | 234 ± 53 | 0.11 |
| 1.80 | 1277 ± 52 | 235 ± 56 | 0.09 |
| 1.82 | 1268 ± 52 | 236 ± 58 | 0.07 |
| 1.84 | 1258 ± 52 | 237 ± 61 | 0.05 |
| 1.86 | 1249 ± 52 | 238 ± 64 | 0.04 |
| 1.88 | 1240 ± 52 | 238 ± 68 | 0.02 |
| 1.90 | 1231 ± 52 | 238 ± 72 | 0.01 |
| 1.92 | 1222 ± 52 | 238 ± 76 | 0.00 |
| 1.94 | 1213 ± 52 | 237 ± 80 | 0.01 |
| 1.96 | 1204 ± 52 | 236 ± 86 | 0.02 |
| 1.98 | 1195 ± 52 | 235 ± 92 | 0.03 |
| 2.00 | 1187 ± 52 | 235 ± 98 | 0.04 |

By changing to $n_2$ to be 2.05, for a substrate index of refraction of 1.84, we get $SHAV_{12}=0.28$, $TOL_1=52$, $TOL_2=142$, the reflectivity per $\text{Å}^2$ of error in $t_2$ may further be reduced by substituting these numerical values into Equation (24A) to obtain:

$$\frac{R_{min}}{2} = 1000 \left(\frac{1}{142}\right)^2 \left\{ 1 - \left[ 0.28 \left(\frac{142}{145}\right) \right]^2 \right\} = 0.03 \frac{ppm}{2} \quad (24C)$$

However, a material having an index of refraction equal to 2.05 is not readily available. Thus, according to this invention, the concept of an effective index layer, hereinafter called "EIL" is introduced. A reflective surface 16A of the introcavity element 16 may have as many as twenty dielectric films. An optical apparatus may be designed, for example, to reflect a beam of a particular frequency and to be antireflective to all other beams. The apparatus may be designed to transmit beams, and an antireflective coating is important to prevent reflections from an optical surface. The EIL is a concept wherein, for the purpose of designing an antireflective surface, a multilayer film apparatus may be treated as if it were a two film apparatus. The combination of multiple films, each of a different thickness and index of refraction, may be treated as a single low index of refraction outer surface, with only a second or inner film having an equivalent thickness and equivalent index of refraction. Thus, the equivalent index of refraction may be tailored to make possible an antireflective surface with substantially no reflection.

William H. Southwell, in "Coating Design Using Very Thin High- and Low-index Layers", Applied optics. Vol. 24, No. 4, 15 Feb. 1985 describes the use of an equivalent index of refraction and an equivalent thickness for a multilayer film in designing an optical coating. Southwell derives Equations for the thicknesses and indices of refraction of two films which produce a predetermined equivalent thickness and index of refraction. For a two film coating, Southwell derives that the equivalent index of refraction N equals:

$$N = \left[ \frac{n_H^2 t_H + n_L^2 t_L}{t_H + t_L} \right]^{0.5} \quad (25)$$

Factoring $n_H$ from the numerator and denominator, dividing out common factors, and defining a new factor, $$r = \frac{t_L}{t_H},$$

then the equivalent index of refraction N may be written as:

$$N = \left[ \frac{n_H^2 + n_L^2 r}{1 + r} \right]^{0.5}, \quad (25A)$$

where N is the equivalent index of refraction, $t_H$ is the thickness of the film having the higher index of refraction $n_H$, and $t_L$ is the thickness of the film having the lower index of refraction $n_L$.

The concept of equivalent index of refraction is used to develop a broadband antireflective coating for glass, which does not have zero reflectivity at any wavelength. The present invention uses the concepts of equivalent index of refraction and equivalent thickness of film over a very narrow band of wavelengths, for example a bandwidth typical of a ring laser gyroscope, to reduce the reflectivity to zero at that bandwidth.

Consider, for example, an outer film 18 having an index of refraction $n_1=1.48$ used with an equivalent inner film (which might be a large number of stacked films) having an index of refraction, $n_2=2.05$. The index $n_2=2.05$ was chosen because it produces a very low reflectance when coated in proper thickness. Assume that $SHAV_{12}=0.28$, $TOL_1=52$, and $TOL_2=142$.

The minimum reflectivity per $(\text{Å})^2$ is shown in Equation (24C). Present well-known materials can be stacked to obtain any desired refractive index between the lower and higher indices of refraction, $n_1$ and $n_2$. For $SiO_2$ and $TiO_2$, the range is 1.48 to 2.30.

The use of very thin films instead of a high index of refraction inner film, in a multilayer film produces an antireflective coating that is very tolerant to its overall thickness error. For example, when the substrate is SF57, and when only two materials, a high index and a low index of refraction material are alternated in a multilayer film with the outside film having the lower index of refraction material, the ratio of the thicknesses of the high index of refraction films, $t_H$, to the thicknesses of the low index of refraction films, $t_L$, in the computation of the EIL is not very critical.

It is instructive to compare antireflective film calculations wherein the outer film index of refraction is 1.48 (silica). For silica and titania, Table 2 shows the total thickness of the EIL inner layer and the ratio the low index to high index thicknesses therein as a function of EIL effective index of refraction for a substrate index of refraction of 1.84.

TABLE 2

For silica (SiO$_2$) and titania (TiO$_2$):

| $\dfrac{t_L}{t_H} = r$ Thickness ratio | EIL index of refraction | EIL T (Å) |
|---|---|---|
| 0.00 | 2.30 | 240 |
| 0.02 | 2.29 | 245 |
| 0.03 | 2.28 | 250 |
| 0.05 | 2.27 | 256 |
| 0.06 | 2.26 | 262 |
| 0.08 | 2.25 | 268 |
| 0.10 | 2.24 | 275 |
| 0.11 | 2.23 | 282 |
| 0.13 | 2.22 | 290 |
| 0.15 | 2.21 | 296 |
| 0.17 | 2.20 | 304 |
| 0.19 | 2.19 | 312 |
| 0.21 | 2.18 | 321 |
| 0.23 | 2.17 | 331 |
| 0.25 | 2.16 | 341 |
| 0.27 | 2.15 | 352 |
| 0.30 | 2.14 | 363 |
| 0.32 | 2.13 | 375 |
| 0.35 | 2.12 | 388 |
| 0.37 | 2.11 | 403 |
| 0.40 | 2.10 | 418 |
| 0.42 | 2.09 | 435 |
| 0.45 | 2.08 | 455 |
| 0.48 | 2.07 | 476 |
| 0.51 | 2.06 | 500 |
| 0.54 | 2.05 | 528 |
| 0.57 | 2.04 | 560 |
| 0.60 | 2.03 | 601 |
| 0.64 | 2.02 | 658 |

As shown in FIG. 2, the film stack 20 may comprise, for example, a TiO$_2$ film 22 next to the substrate 24. The next film 26 outward from film 22 may be SiO$_2$. TiO$_2$ films 28 alternate with SiO$_2$ films 30. The outer SiO$_2$ layer is made over-thick so that it may be milled down to exactly the correct thickness, according to this invention, to create an antireflective film.

Figure 3:
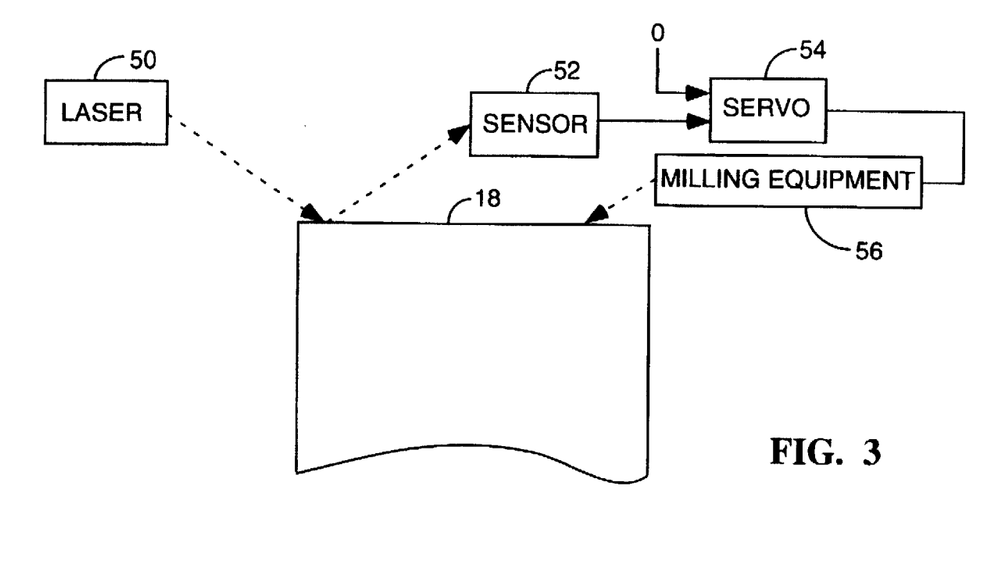
FIG. 3 is a block diagram of apparatus according to this invention for controlling the reflectivity of an antireflective coating.

A laser beam, having the spectrum of the laser with which the antireflective device is to be used is directed from a laser 50 onto the film 18 in the region where the film 18 is being milled. The reflected laser beam enters a sensor 52 to produce an electrical signal. That signal is compared in a servo 54 to a zero signal, and the error signal is delivered to the milling equipment 56 to control the milling process.

Other material combinations may be used, and the following tables demonstrate some of the variations.

TABLE 1A

| | $n_H = 2.20$ (Ta$_2$O$_5$:HfO$_2$) | | $n_L = n_I = 1.48$ (SiO$_2$) | |
|---|---|---|---|---|
| Substrate refractive index | Thickness of outer film No. 1 ± TOL$_1$ | | Thickness of inner film No. 2 ± TOL$_2$ | SHAV$_{12}$ |
| 1.40 | 1493 ± 52 | | 214 ± 31 | 1.01 |
| 1.42 | 1479 ± 52 | | 219 ± 32 | 0.95 |
| 1.44 | 1464 ± 52 | | 224 ± 33 | 0.89 |
| 1.46 | 1450 ± 52 | | 228 ± 34 | 0.83 |
| 1.48 | 1436 ± 52 | | 233 ± 35 | 0.78 |
| 1.50 | 1423 ± 52 | | 237 ± 37 | 0.73 |
| 1.52 | 1410 ± 52 | | 242 ± 38 | 0.68 |
| 1.54 | 1397 ± 52 | | 246 ± 39 | 0.68 |
| 1.56 | 1385 ± 52 | | 250 ± 41 | 0.58 |
| 1.58 | 1373 ± 52 | | 254 ± 43 | 0.54 |
| 1.60 | 1361 ± 52 | | 259 ± 44 | 0.50 |

TABLE 1A-continued

| $n_H = 2.20$ (Ta$_2$O$_5$:HfO$_2$) | | $n_L = n_I = 1.48$ (SiO$_2$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.62 | 1349 ± 52 | 262 ± 46 | 0.46 |
| 1.64 | 1338 ± 52 | 266 ± 48 | 0.43 |
| 1.66 | 1327 ± 52 | 270 ± 50 | 0.39 |
| 1.68 | 1318 ± 52 | 274 ± 53 | 0.36 |
| 1.70 | 1305 ± 52 | 277 ± 55 | 0.33 |
| 1.72 | 1295 ± 52 | 281 ± 58 | 0.30 |
| 1.74 | 1284 ± 52 | 284 ± 61 | 0.28 |
| 1.76 | 1274 ± 52 | 288 ± 64 | 0.25 |
| 1.78 | 1264 ± 52 | 291 ± 67 | 0.23 |
| 1.80 | 1254 ± 52 | 294 ± 71 | 0.20 |
| 1.82 | 1244 ± 52 | 298 ± 75 | 0.18 |
| 1.84 | 1235 ± 52 | 301 ± 80 | 0.16 |
| 1.86 | 1225 ± 52 | 304 ± 85 | 0.15 |
| 1.88 | 1216 ± 52 | 307 ± 91 | 0.13 |
| 1.90 | 1207 ± 52 | 309 ± 98 | 0.11 |
| 1.92 | 1198 ± 52 | 312 ± 105 | 0.10 |
| 1.94 | 1189 ± 52 | 315 ± 114 | 0.09 |
| 1.96 | 1180 ± 52 | 317 ± 124 | 0.07 |
| 1.98 | 1171 ± 52 | 319 ± 136 | 0.06 |

The corresponding Table 2A follows for the substrate having $n_1 = 1.84$.

TABLE 2A

For Ta$_2$O$_5$:HfO$_2$ and SiO$_2$:

| $\dfrac{t_L}{t_H} = r$ Thickness ratio | EIL index of refraction | EIL T (Å) |
|---|---|---|
| 0.00 | 2.20 | |
| 0.05 | 2.17 | |
| 0.10 | 2.14 | |
| 0.15 | 2.12 | |
| 0.20 | 2.10 | |
| 0.25 | 2.08 | |
| 0.30 | 2.06 | 516 |
| 0.35 | 2.04 | |
| 0.40 | 2.02 | |
| 0.45 | 2.00 | |

Only $$\frac{t_L}{t_H} = 0.30 \text{ or } 0.35$$

are of interest for antireflection where the EIL index of refraction is about 2.05.

TABLE 1B

| | $n_H = 2.00$ (ZrO$_2$) | | $n_L = n_I = 1.48$ (SiO$_2$) | |
|---|---|---|---|---|
| Substrate refractive index | Thickness of outer film No. 1 ± TOL$_1$ | | Thickness of inner film No. 2 ± TOL$_2$ | SHAV$_{12}$ |
| 1.40 | 1438 ± 52 | | 317 ± 43 | 0.85 |
| 1.42 | 1421 ± 52 | | 326 ± 46 | 0.80 |
| 1.44 | 1404 ± 52 | | 336 ± 47 | 0.76 |
| 1.46 | 1389 ± 52 | | 346 ± 49 | 0.72 |
| 1.48 | 1373 ± 52 | | 355 ± 52 | 0.68 |
| 1.50 | 1358 ± 52 | | 365 ± 52 | 0.65 |
| 1.52 | 1343 ± 52 | | 376 ± 52 | 0.61 |
| 1.54 | 1328 ± 52 | | 386 ± 52 | 0.58 |
| 1.56 | 1313 ± 52 | | 397 ± 52 | 0.55 |
| 1.58 | 1299 ± 52 | | 408 ± 66 | 0.53 |
| 1.60 | 1285 ± 52 | | 420 ± 70 | 0.50 |
| 1.62 | 1271 ± 52 | | 433 ± 74 | 0.48 |

TABLE 1B-continued

| | $n_H = 2.00$ (ZrO$_2$) | $n_1 = n_I = 1.48$ (SiO$_2$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.64 | 1257 ± 52 | 446 ± 78 | 0.44 |
| 1.66 | 1243 ± 52 | 460 ± 84 | 0.43 |
| 1.68 | 1229 ± 52 | 476 ± 90 | 0.42 |
| 1.70 | 1214 ± 52 | 493 ± 97 | 0.40 |
| 1.72 | 1200 ± 52 | 513 ± 104 | 0.38 |
| 1.74 | 1185 ± 52 | 536 ± 113 | 0.37 |
| 1.76 | 1169 ± 52 | 563 ± 123 | 0.35 |
| 1.78 | 1152 ± 52 | 597 ± 135 | 0.34 |
| 1.80 | 1132 ± 52 | 645 ± 150 | 0.33 |

The corresponding table 2B follows for the substrate having n=1.84.

TABLE 2B

For ZrO$_2$ and SiO$_2$:

| $\frac{t_L}{t_H} = r$ Thickness ratio | EIL index of refraction | EIL T (Å) |
|---|---|---|
| 0.00 | 2.00 | |
| 0.05 | 1.98 | |
| 0.10 | 1.96 | |
| 0.15 | 1.94 | |
| 0.20 | 1.92 | |
| 0.25 | 1.91 | |
| 0.30 | 1.89 | |
| 0.35 | 1.88 | |
| 0.40 | 1.87 | |
| 0.45 | 1.85 | |

None of the values of Table 2B are of interest because the EIL index of refraction is too small.

TABLE 1C

| | $n_H = 2.05$ (ZrO$_2$) | $n_1 = n_I = 1.48$ (SiO$_2$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.40 | 1456 ± 52 | 283 ± 39 | 0.89 |
| 1.42 | 1440 ± 52 | 291 ± 41 | 0.84 |
| 1.44 | 1424 ± 52 | 299 ± 43 | 0.79 |
| 1.46 | 1409 ± 52 | 307 ± 44 | 0.75 |
| 1.48 | 1394 ± 52 | 315 ± 46 | 0.71 |
| 1.50 | 1380 ± 52 | 323 ± 48 | 0.67 |
| 1.52 | 1365 ± 52 | 331 ± 51 | 0.63 |
| 1.54 | 1351 ± 52 | 339 ± 53 | 0.59 |
| 1.56 | 1338 ± 52 | 347 ± 56 | 0.56 |
| 1.58 | 1324 ± 52 | 355 ± 58 | 0.53 |
| 1.60 | 1311 ± 52 | 364 ± 61 | 0.50 |
| 1.62 | 1298 ± 52 | 372 ± 65 | 0.47 |
| 1.64 | 1286 ± 52 | 381 ± 68 | 0.45 |
| 1.66 | 1273 ± 52 | 391 ± 72 | 0.42 |
| 1.68 | 1261 ± 52 | 401 ± 77 | 0.40 |
| 1.70 | 1248 ± 52 | 411 ± 82 | 0.38 |
| 1.72 | 1236 ± 52 | 422 ± 87 | 0.36 |
| 1.74 | 1224 ± 52 | 434 ± 94 | 0.35 |
| 1.76 | 1212 ± 52 | 447 ± 101 | 0.33 |
| 1.78 | 1199 ± 52 | 462 ± 109 | 0.31 |
| 1.80 | 1187 ± 52 | 478 ± 118 | 0.30 |
| 1.82 | 1175 ± 52 | 497 ± 129 | 0.29 |
| 1.84 | 1162 ± 52 | 520 ± 142 | 0.28 |
| 1.86 | 1148 ± 52 | 548 ± 158 | 0.27 |
| 1.88 | 1133 ± 52 | 585 ± 178 | 0.26 |
| 1.90 | 1113 ± 52 | 648 ± 203 | 0.25 |

The corresponding Table 2C follows for the substrate having n=1.84.

TABLE 2C

| $\frac{t_L}{t_H} = r$ Thickness ratio | EIL index of refraction | EIL T (Å) |
|---|---|---|
| 0.00 | 2.05 | 5.16 |
| 0.05 | 2.03 | |
| 0.10 | 2.00 | |
| 0.15 | 1.98 | |
| 0.20 | 1.97 | |
| 0.25 | 1.95 | |
| 0.30 | 1.93 | |
| 0.35 | 1.92 | |
| 0.40 | 1.90 | |
| 0.45 | 1.89 | |

Because $n_H$ is exactly right for anti-reflection, the combination is not useful. The $n_H$ material is used alone as layer 2.

TABLE 1D

| | $n_H = 2.20$ (HfO$_2$:Ta2O$_5$) | $n_1 = n_I = 1.65$ (Al$_2$O$_3$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.40 | 1302 ± 36 | 324 ± 31 | 0.99 |
| 1.42 | 1287 ± 36 | 335 ± 32 | 0.96 |
| 1.44 | 1272 ± 36 | 346 ± 33 | 0.92 |
| 1.46 | 1257 ± 36 | 357 ± 34 | 0.89 |
| 1.48 | 1243 ± 36 | 368 ± 35 | 0.86 |
| 1.50 | 1229 ± 36 | 380 ± 37 | 0.83 |
| 1.52 | 1215 ± 36 | 391 ± 38 | 0.80 |
| 1.54 | 1201 ± 36 | 404 ± 39 | 0.78 |
| 1.56 | 1187 ± 36 | 416 ± 41 | 0.75 |
| 1.58 | 1173 ± 36 | 430 ± 43 | 0.73 |
| 1.60 | 1159 ± 36 | 444 ± 44 | 0.70 |
| 1.62 | 1145 ± 36 | 459 ± 46 | 0.68 |
| 1.64 | 1130 ± 36 | 475 ± 48 | 0.66 |
| 1.66 | 1115 ± 36 | 492 ± 50 | 0.64 |
| 1.68 | 1100 ± 36 | 512 ± 53 | 0.63 |
| 1.70 | 1083 ± 36 | 534 ± 55 | 0.61 |
| 1.72 | 1065 ± 36 | 559 ± 58 | 0.59 |
| 1.74 | 1044 ± 36 | 591 ± 61 | 0.58 |
| 1.76 | 1012 ± 36 | 644 ± 64 | 0.56 |

There is no solution for an antireflective coating with $n_s$=1.84 for these indices for $n_H$ and $n_L$; therefore a corresponding table 2D is not presented.

TABLE 1E

| | $n_H = 2.15$ (Ta$_2$O$_5$) | $n_1 = N_I = 1.48$ (SiO$_2$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.40 | 1483/−52 | 233 ± 33 | 0.97 |
| 1.42 | 1468 ± 52 | 239 ± 34 | 0.91 |
| 1.44 | 1453 ± 52 | 245 ± 36 | 0.86 |
| 1.46 | 1439 ± 52 | 250 ± 37 | 0.80 |
| 1.48 | 1425 ± 52 | 255 ± 38 | 0.75. |
| 1.50 | 1411 ± 52 | 261 ± 40 | 0.71 |
| 1.52 | 1398 ± 52 | 266 ± 41 | 0.66 |
| 1.54 | 1385 ± 52 | 271 ± 43 | 0.62 |
| 1.56 | 1372 ± 52 | 276 ± 45 | 0.58 |
| 1.58 | 1360 ± 52 | 281 ± 47 | 0.54 |
| 1.60 | 1348 ± 52 | 286 ± 49 | 0.50 |
| 1.62 | 1336 ± 52 | 281 ± 51 | 0.47 |
| 1.64 | 1324 ± 52 | 296 ± 54 | 0.43 |
| 1.66 | 1313 ± 52 | 301 ± 56 | 0.40 |
| 1.68 | 1302 ± 52 | 306 ± 59 | 0.38 |
| 1.70 | 1290 ± 52 | 311 ± 62 | 0.35 |
| 1.72 | 1280 ± 52 | 316 ± 65 | 0.32 |

TABLE 1E-continued

| $n_H = 2.15$ (Ta$_2$O$_x$) | | $n_L = N_L = 1.48$ (SiO$_2$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.74 | 1269 ± 52 | 321 ± 69 | 0.30 |
| 1.76 | 1258 ± 52 | 326 ± 73 | 0.28 |
| 1.78 | 1248 ± 52 | 331 ± 77 | 0.26 |
| 1.80 | 1238 ± 52 | 337 ± 82 | 0.24 |
| 1.82 | 1228 ± 52 | 342 ± 88 | 0.22 |
| 1.84 | 1218 ± 52 | 347 ± 94 | 0.20 |
| 1.86 | 1208 ± 52 | 353 ± 101 | 0.19 |
| 1.88 | 1198 ± 52 | 359 ± 109 | 0.17 |
| 1.90 | 1189 ± 52 | 366 ± 119 | 0.16 |
| 1.92 | 1180 ± 52 | 372 ± 130 | 0.15 |
| 1.94 | 1170 ± 52 | 380 ± 143 | 0.14 |
| 1.96 | 1161 ± 52 | 388 ± 159 | 0.13 |
| 1.98 | 1152 ± 52 | 398 ± 179 | 0.12 |

The corresponding table 2E follows for the substrate having n=1.84.

TABLE 2E

For Ta$_2$O$_x$ and SiO$_2$:

| $\frac{t_L}{t_H} = r$ Thickness ratio | EIL index of refraction | EIL T (Å) |
|---|---|---|
| 0.00 | 2.15 | |
| 0.05 | 2.12 | |
| 0.10 | 2.10 | |
| 0.15 | 2.08 | |
| 0.20 | 2.05 | 516 |
| 0.25 | 2.03 | |
| 0.30 | 2.02 | |
| 0.35 | 2.00 | |
| 0.40 | 1.98 | |
| 0.45 | 1.97 | |

The combination having the ratio $$\frac{t_L}{t_H} = 0.20$$

is of interest because the EIL index of refraction is 2.05 which is correct for high tolerance antireflection.

TABLE 1F

| $n_H = 2.25$ (HfO$_2$) | | $n_L = n_L = 1.48$ (SiO$_2$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.40 | 1502 ± 52 | 197 ± 28 | 1.06 |
| 1.42 | 1488 ± 52 | 201 ± 29 | 0.89 |
| 1.44 | 1473 ± 52 | 206 ± 30 | 0.92 |
| 1.46 | 1460 ± 52 | 210 ± 31 | 0.86 |
| 1.48 | 1446 ± 52 | 214 ± 32 | 0.80 |
| 1.50 | 1433 ± 52 | 218 ± 34 | 0.75 |
| 1.52 | 1420 ± 52 | 221 ± 35 | 0.69 |
| 1.54 | 1408 ± 52 | 225 ± 36 | 0.64 |
| 1.56 | 1396 ± 52 | 229 ± 3 | 0.59 |
| 1.58 | 1384 ± 52 | 232 ± 39 | 0.55 |
| 1.60 | 1372 ± 52 | 235 ± 40 | 0.50 |
| 1.62 | 1361 ± 52 | 238 ± 42 | 0.46 |
| 1.64 | 1350 ± 52 | 242 ± 44 | 0.42 |
| 1.66 | 1339 ± 52 | 244 ± 45 | 0.38 |
| 1.68 | 1328 ± 52 | 247 ± 47 | 0.35 |
| 1.70 | 1317 ± 52 | 250 ± 49 | 0.31 |
| 1.72 | 1307 ± 52 | 253 ± 52 | 0.28 |
| 1.74 | 1297 ± 52 | 255 ± 54 | 0.25 |

TABLE 1F-continued

| $n_H = 2.25$ (HfO$_2$) | | $n_L = n_L = 1.48$ (SiO$_2$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.76 | 1287 ± 52 | 257 ± 57 | 0.22 |
| 1.78 | 1277 ± 52 | 260 ± 59 | 0.20 |
| 1.80 | 1267 ± 52 | 262 ± 62 | 0.17 |
| 1.82 | 1257 ± 52 | 264 ± 66 | 0.15 |
| 1.84 | 1248 ± 52 | 265 ± 69 | 0.12 |
| 1.86 | 1239 ± 52 | 267 ± 73 | 0.10 |
| 1.88 | 1229 ± 52 | 268 ± 78 | 0.08 |
| 1.90 | 1220 ± 52 | 269 ± 83 | 0.07 |
| 1.92 | 1211 ± 52 | 270 ± 88 | 0.05 |
| 1.94 | 1202 ± 52 | 270 ± 95 | 0.03 |
| 1.96 | 1194 ± 52 | 270 ± 102 | 0.02 |
| 1.98 | 1185 ± 52 | 269 ± 110 | 0.01 |

The corresponding table 2F follows for the substrate having n=1.84. $n_L=n_1=1.48$, $n_H=n_2=2.25$.

TABLE 2F $t_L = T_1$, $t_H = t_2$

| $\frac{t_L}{t_H} = r$ Thickness ratio | EIL index of refraction | EIL T (Å) |
|---|---|---|
| 0.00 | 2.25 | |
| 0.05 | 2.22 | |
| 0.10 | 2.19 | |
| 0.15 | 2.16 | |
| 0.20 | 2.14 | |
| 0.25 | 2.12 | |
| 0.30 | 2.10 | |
| 0.35 | 2.08 | |
| 0.40 | 2.06 | 516 |
| 0.45 | 2.04 | |

The combination having the ratio $$\frac{t_L}{t_H} = 0.40$$

is of interest because the EIL index of refraction is 2.06 which is almost the correct value of 2.05 for anti-reflection.

TABLE 1G

| $n_H = 2.10$ (ZrO$_2$:Ta$_2$O$_x$) | | $n_L = n_L = 1.65$ (AL$_2$O$_3$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.40 | 1249 ± 36 | 410 ± 36 | .90 |
| 1.42 | 1231 ± 36 | 426 ± 37 | 0.87 |
| 1.44 | 1213 ± 36 | 443 ± 39 | 0.84 |
| 1.46 | 1195 ± 36 | 461 ± 40 | 0.81 |
| 1.48 | 1176 ± 36 | 479 ± 42 | 0.78 |
| 1.50 | 1157 ± 36 | 500 ± 44 | 0.76 |
| 1.52 | 1137 ± 36 | 522 ± 46 | 0.74 |
| 1.54 | 1117 ± 36 | 546 ± 48 | 0.72 |
| 1.56 | 1094 ± 36 | 574 ± 50 | 0.69 |
| 1.58 | 1068 ± 36 | 608 ± 52 | 0.68 |
| 1.60 | 1034 ± 36 | 658 ± 55 | 0.66 |

There is no solution for an antireflective coating with $n_s=1.84$ for the indices for $n_H$ and $n_L$, and a corresponding Table 2G is not presented.

TABLE 1H

| | $n_H = 2.1$ (ZrO$_2$:Ta$_2$O$_5$) | $n_L = n_s = 1.48$ (SiO$_2$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.40 | 1471 ± 52 | 266 ± 36 | 0.93 |
| 1.42 | 1455 ± 52 | 263 ± 37 | 0.87 |
| 1.44 | 1440 ± 52 | 269 ± 39 | 0.82 |
| 1.46 | 1425 ± 52 | 276 ± 40 | 0.77 |
| 1.48 | 1411 ± 52 | 282 ± 42 | 0.73 |
| 1.50 | 1397 ± 52 | 289 ± 44 | 0.69 |
| 1.52 | 1383 ± 52 | 295 ± 46 | 0.64 |
| 1.54 | 1370 ± 52 | 301 ± 48 | 0.61 |
| 1.56 | 1357 ± 52 | 308 ± 50 | 0.57 |
| 1.58 | 1344 ± 52 | 314 ± 52 | 0.53 |
| 1.60 | 1332 ± 52 | 321 ± 52 | 0.50 |
| 1.62 | 1310 ± 52 | 327 ± 52 | 0.47 |
| 1.64 | 1307 ± 52 | 334 ± 60 | 0.44 |
| 1.66 | 1295 ± 52 | 340 ± 63 | 0.41 |
| 1.68 | 1284 ± 52 | 347 ± 67 | 0.39 |
| 1.70 | 1272 ± 52 | 354 ± 71 | 0.37 |
| 1.72 | 1261 ± 52 | 361 ± 75 | 0.34 |
| 1.74 | 1250 ± 52 | 369 ± 80 | 0.32 |
| 1.76 | 1239 ± 52 | 377 ± 85 | 0.30 |
| 1.78 | 1228 ± 52 | 385 ± 91 | 0.29 |
| 1.80 | 1217 ± 52 | 394 ± 97 | 0.27 |
| 1.82 | 1206 ± 52 | 403 ± 105 | 0.25 |
| 1.84 | 1196 ± 52 | 413 ± 114 | 0.24 |
| 1.86 | 1185 ± 52 | 425 ± 124 | 0.23 |
| 1.88 | 1174 ± 52 | 437 ± 136 | 0.22 |
| 1.90 | 1164 ± 52 | 452 ± 150 | 0.21 |
| 1.92 | 1153 ± 52 | 470 ± 168 | 0.20 |
| 1.94 | 1142 ± 52 | 491 ± 190 | 0.19 |
| 1.96 | 1130 ± 52 | 520 ± 218 | 0.18 |
| 1.98 | 1117 ± 52 | 561 ± 256 | 0.18 |

The corresponding table 2H follows for the substrate having n=1.84.

TABLE 2H

| $\frac{t_L}{t_H} = r$ Thickness ratio | EIL index of refraction | EIL T (Å) |
|---|---|---|
| 0.00 | 2.10 | |
| 0.05 | 2.08 | |
| 0.10 | 2.05 | 516 |
| 0.15 | 2.03 | |
| 0.20 | 2.01 | |
| 0.25 | 1.99 | |
| 0.30 | 1.97 | |
| 0.35 | 1.96 | |
| 0.40 | 1.94 | |
| 0.45 | 1.93 | |

The combination having the ratio $$\frac{t_L}{t_H} = 0.10$$

is of interest because the EIL index of refraction is 2.05 which is correct for anti-reflection.

TABLE 1J

| | $n_H = 2.30$ (TiO$_2$) | $n_L = n_s = 1.65$ (Al$_2$O$_3$) | |
|---|---|---|---|
| Substrate refractive index | Thickness of outer film No. 1 ± TOL$_1$ | Thickness of inner film No. 2 ± TOL$_2$ | SHAV$_{12}$ |
| 1.40 | 1335 ± 36 | 268 ± 26 | 1.09 |
| 1.42 | 1322 ± 36 | 276 ± 27 | 1.05 |
| 1.44 | 1308 ± 36 | 284 ± 28 | 1.01 |
| 1.46 | 1295 ± 36 | 292 ± 29 | 0.97 |
| 1.48 | 1283 ± 36 | 300 ± 30 | 0.94 |
| 1.50 | 1270 ± 36 | 308 ± 31 | 0.90 |
| 1.52 | 1268 ± 36 | 316 ± 32 | 0.87 |
| 1.54 | 1246 ± 36 | 324 ± 33 | 0.84 |
| 1.56 | 1234 ± 36 | 332 ± 34 | 0.81 |
| 1.58 | 1223 ± 36 | 341 ± 36 | 0.78 |
| 1.60 | 1211 ± 36 | 349 ± 37 | 0.75 |
| 1.62 | 1200 ± 36 | 358 ± 38 | 0.73 |
| 1.64 | 1189 ± 36 | 367 ± 40 | 0.70 |
| 1.66 | 1178 ± 36 | 377 ± 41 | 0.68 |
| 1.68 | 1166 ± 36 | 386 ± 43 | 0.66 |
| 1.70 | 1155 ± 36 | 396 ± 45 | 0.64 |
| 1.72 | 1144 ± 36 | 407 ± 47 | 0.62 |
| 1.74 | 1133 ± 36 | 418 ± 49 | 0.60 |
| 1.76 | 1122 ± 36 | 430 ± 51 | 0.58 |
| 1.78 | 1111 ± 36 | 443 ± 53 | 0.57 |
| 1.80 | 1100 ± 36 | 457 ± 56 | 0.55 |
| 1.82 | 1088 ± 36 | 472 ± 58 | 0.53 |
| 1.84 | 1075 ± 36 | 489 ± 61 | 0.52 |
| 1.86 | 1063 ± 36 | 508 ± 64 | 0.51 |
| 1.88 | 1049 ± 36 | 530 ± 68 | 0.49 |
| 1.90 | 1032 ± 36 | 558 ± 72 | 0.48 |
| 1.92 | 1010 ± 36 | 601 ± 76 | 0.47 |

The corresponding table 2J follows for the substrate having n=1.84.

TABLE 2J

| $\frac{t_L}{t_H} = r$ Thickness ratio | EIL index of refraction | EIL T (Å) |
|---|---|---|
| 0.00 | 2.30 | |
| 0.05 | 2.27 | |
| 0.10 | 2.25 | 489 |
| 0.15 | 2.23 | |
| 0.20 | 2.20 | |
| 0.25 | 2.19 | |
| 0.30 | 2.17 | |
| 0.35 | 2.15 | |
| 0.40 | 2.14 | |
| 0.45 | 2.12 | |

Only the ratio $$\frac{t_L}{t_H} = 0.10$$

is of interest for antireflection where the EIL index of refraction is about 2.25, which is the highest tolerance inner layer index where the outer layer index of refraction is 1.65.

In operation, the servo 54 directs the milling equipment to mill the surface 18 until a condition of no or minimum signal appears at the output of the sensor 52. The sensor 52 and the servo 54 may, if desired, stop the milling equipment 56 before the signal reaches zero but after it drops below a predetermined value. The servo 54 may also, if desired, change the milling speed as the zero signal is approached.

Figure 4:
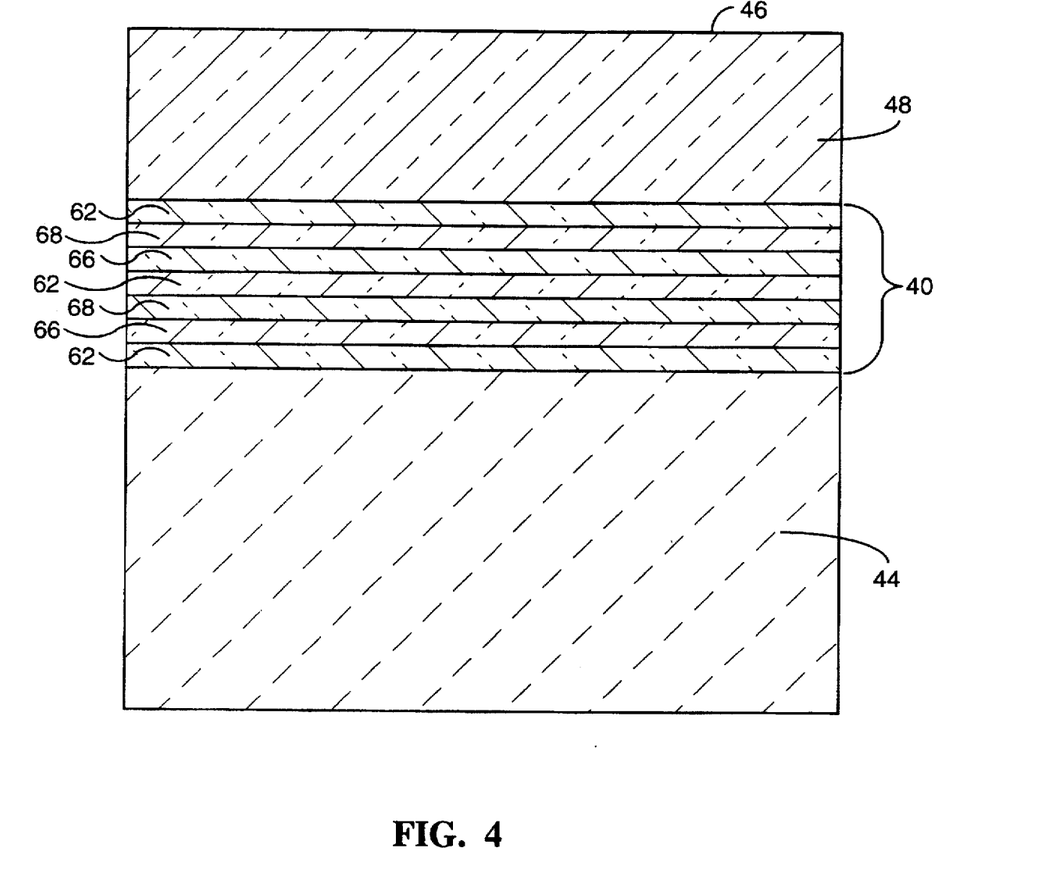
FIG. 4 shows a multilayer film formed of three dielectric materials having different refractive indices.

As shown in FIG. 4, the EIL film stack 40 may comprise, for example, a TiO$_2$ (titania) film 62 next to the substrate 44. The next film 66 outward from film 62 may be a low index film such as SiO$_2$ (silica) or alumina (Al$_2$O$_3$). A single additional dielectric material 68 may be chosen from a group consisting of silica, tantala, hafnia, or zirconia (where alumina is the low index film 66) or a single additional dielectric material chosen from a group consisting of alumina, tantala, hafnia, or zirconia (where silica is the low index film 66). The next film outward from film 68 would be the high index material film 62. The pattern of alternating films would be repeated in the outward direction, where the same material 66 would be stacked upon this second thin layer of film 62, and thin film material 68 would be stacked on film 66, this set (62, 66, and 68) being repeated a number of times, forming the EIL film stack 40. The outer layer 48 would be a low index film such as $SiO_2$ (silica) or $Al_2O_3$ (alumina) and is made over-thick so it may be milled down to exactly the correct thickness, according to this invention, to create an antireflective film.

In a practical situation, the outer film 48 is deposited thick enough that it can be milled. A laser beam having the spectrum of the laser wherein the antireflective device is to be used, is directed from a laser 50 (FIG. 3) onto the film 48 in the region where the film 48 is to be milled.

The embodiments of the invention described above teach how to make thickness-error-tolerant antireflection coatings on the assumption that we have the option of post trimming the thickness of the outer layer using reflection from the coating as feedback to determine when to stop. To accomplish this, the index of refraction of the inner layer has to be chosen to make the phasor diagram of the three interfaces of a two layer antireflective coating a triangle with a very small altitude. This usually requires an index of refraction that is not commonly available. The index needed can be achieved by:

1. Atomic mixing in the correct ratio of 2 (or more) materials whose indices of refraction are respectively higher and lower than (or bracket) the desired index; or
2. By making up the desired thickness of the inner layer of several or many thin sublayers of two or more materials whose indices of refraction are respectively higher and lower than (or bracket) the desired index and whose individual thicknesses are much less than a wavelength (which means that we don't have to compute the reflection of the sublayers but simply regard the assembly as a single layer of some effective index).

Option 1 can have some undesirable side effects wherein two or more incompatible materials can form polycrystals yielding higher scatter and/or have increased optical absorption coefficients. Thin films are more forgiving of mixing of incompatible materials than the bulk because the atomic bonds in the films can be strained without breaking (e.g. strained quantum well devices), but there are limits to this. Therefore option 2, which uses the effective index layer (EIL) approach is preferred.

Figure 6:
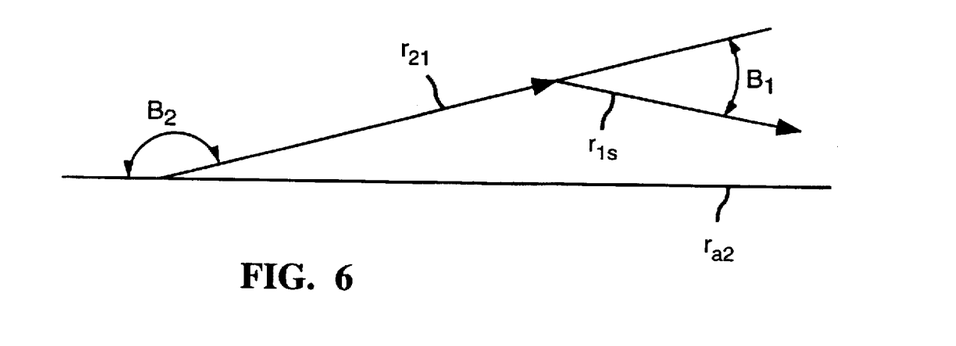
FIG. 6 is a phasor diagram of the reflectance in the complex plane for the layers of the multilayer antireflective structure of FIG. 5.

FIG. 5 illustrates a light beam incident upon a two-layer coating that comprises a first layer 80 formed on a substrate 81 and second layer 82 formed on the first layer 80. FIG. 6 is a phasor diagram in the complex plane for the reflections at the interfaces between the layers of FIG. 5. The arrows $r_{1s}$, $r_{21}$ and $r_{a2}$ of FIGS. 5 and 6 are complex reflectance phasors at the interfaces between the layers. The vertical axis is the imaginary axis and the horizontal axis is the real axis. For example, the arrow $r_{a2}$ is the reflectance phasor at the interface between the ambient medium and the outer layer, which is denoted by the subscript 2. Similarly, the arrow $r_{21}$ is the phasor for the interface between the second layer 82 and the first layer 80 and the arrow $r_{1s}$ is the phasor for the interface between the first layer 80 and the substrate 81.

The angles $B_1$ and $B_2$ are diretly proportional to the layer thicknesses. Therefore, if the thickness of layer 1 increases, then angle $B_1$ increases, rotating both $r_{21}$ and $r_{2s}$ clockwise as a rigid body about the tip of $r_{a2}$. The total reflectance is the length of the line from the tail of $r_{a2}$ to the head of $r_{1s}$. Thus if the three phasors form a closed triangle, the total reflectance is zero. Therefore, when the sum of lengths $r_{21}$, and $r_{1s}$ is equal to $r_{a2}$ then the angle $B_2$ will be 180° and the angle $B_1$ will be 0° if we are to have zero total reflectance. This is also the situation where an error in angle $B_1$ (or thickness of layer 1) can best be corrected by adjusting the angle $B_2$. The angle $B_2$ is the outer layer thickness which can be adjusted. Thus the desired condition is that $r_{21}+r_{1s}=r_{a2}$. For a substrate material such as SF57 (n=1.84), and with silica as the outer low index layer, this means that we need an inner layer index of less than 2.05. This is a visual description of why the EIL is used to achieve fault tolerance.

The most critical technical point in understanding the present invention is to observe and understand why a low altitude phasor triangle is critical to making the coating independent of the overall thickness of the inner layer. To show this, consider the two phasor diagrams of FIGS. 7 and 8 that are nearly closed triangles, one of large altitude and the other of small altitude. The objective of antireflective coating is to adjust layer thickness to alter the vertex angles of the phasor diagram so that the triangle closes at the lower right vertex. We see that varying the angle of the left vertex (outer layer thickness) can correct for large errors of the top vertex angle (inner layer thickness) if the triangle has small altitude but cannot make substantial correction for errors of the top vertex angle if the altitude is almost as long as the adjacent side.

Therefore, one significant calculation involves finding what combination of two layer indices of refraction results in a triangle in the phasor diagram with a very small altitude for a given substrate index of refraction. A second consideration is what is the ratio of the thickness error tolerance for a properly chosen EIL inner layer compared to that for the normal high index of refraction material. Because phasors are used to understand this, both or these calculations will be done from simple phasor geometry.

Figure 7:
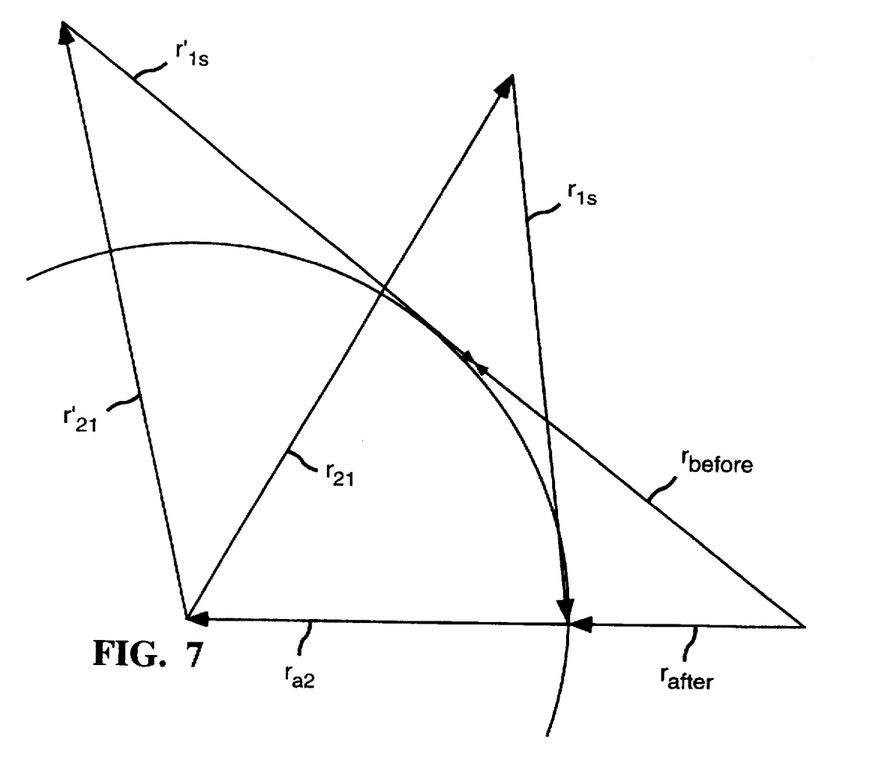
FIG. 7 is a phasor diagram illustrating phasor representations of the reflectance at interfaces before and after trimming the outer layer in a multilayer film for low error tolerance.

FIG. 7 illustrates the interface phasors and their resultant for both before and after trimming the outer layer for the case when the inner layer thickness error corresponds to about 20° too thin and the film refractive indices are not the optimal values. The effect of trimming the outer layer is to make the assembly $r_{21}$ and $r_{1s}$ rotate clockwise about the tip of the phasor $r_{a2}$ so that the tip of $r_{1s}$ rotates about the circle 84 centered at the tip of the phasor $r_{a2}$ as shown. The reflectance before trimming is $r_{before}$ and the reflectance after trimming is $r_{after}$.

For a nearly normal incidence angle, the amplitude of the reflectance at a single interface is:

$$r_{i,i+1} = \frac{n_i - n_{i+1}}{n_i + n_{i+1}} , \qquad (26)$$

where $n_i$ is the index in the incident layer or air and $n_{i+1}$ is the index of the next layer or substrate. In order that the sum of $r_{21}$ with $r_{1s}$ equals $r_{a2}$ we have the relation:

$$\left| \frac{n_a - n_2}{n_a + n_2} \right| = \left| \frac{n_2 - n_1}{n_2 + n_1} - \frac{n_1 - n_s}{n_1 + n_s} \right|. \qquad (27)$$

where subscript a stands for the ambient or incident medium, s stands for substrate, 2 stands for the outer layer, and 1 stands for the inner layer. Equation (26) is now solved for the relation between $n_2$ and $n_1$ in terms of $n_s$ and $n_a$. It turns out that the relation $$\frac{n_1}{n_2} \approx \sqrt{\frac{n_s}{n_a}} \qquad (28)$$

gives an excellent approximation for the ratio of the required layer indices for a wide range of $n_s$ and $n_a$.

Figure 8:
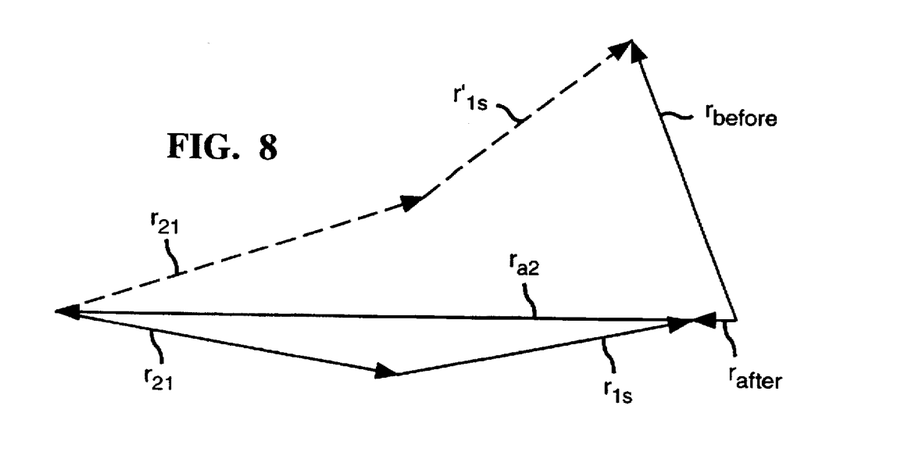
FIG. 8 is a phasor diagram illustrating phasor representations of the reflectance at interfaces before and after trimming the outer layer in a multilayer film for improved error tolerance.

The second calculation considers the geometry of the two opposite extremes as shown in FIG. 8, which is the same as FIG. 7 except that in FIG. 8 the thin film indices of refraction are chosen to satisfy Equation (27) and thereby obtain a phasor triangle of nearly zero altitude when the inner layer has appropriate thickness which makes $r_{21}$, and $r_{1sr}$ lie on a nearly straight line. For this diagram the inner layer again has thickness error corresponding to about 20 degrees. The very short phasor $r_{after}$ is to be compared with $r_{before}$. More importantly, the power reflection reduction by trimming the outer layer is $(r_{after}/r_{before})^2$, which is of order 0.01 compared to a reduction of order 0.6 for the diagram in FIG. 7. The final reflectivity for an error in inner layer thickness corresponding to angle $B_1$ will now be computed in terms of the three phasor lengths. Because $$r_{21} + r_{1s} = r_{a2}, \tag{29}$$

the law of cosines for the base, $r_b$, of the inverted triangle in FIG. 6 is written as:

$$r_b = \sqrt{r_{21}^2 + (r_{a2} - r_{21})^2 - 2r_{21}(r_{a2} - r_{21})\cos(\pi - \alpha)} \tag{30}$$

where $\alpha = 20°$ for FIG. 8. Now we seek the difference between $r_{before}$ and $r_{a2}$ because that difference is the reflectance, $r_{after}$. Note that when $\alpha=0$, the expression in the radical of Equation (30) reverts to $r_{a2}^2$. Equation (30) may then be written as $$r_b = \sqrt{r_{a2}^2 - 2r_{21}(r_{a2} - r_{21})[1 + \cos(\pi - \alpha)]} \tag{31}$$

For $\alpha < 1$ a first order Taylor's series for $\cos \alpha$ is $$\cos\alpha \approx 1 - \frac{\alpha^2}{2} \tag{32}$$

and, further, using $\cos(\pi-\alpha) = -\cos \alpha$ as an excellent approximation for $r_b$, Equation (30) becomes:

$$r_b \approx \sqrt{r_{a2}^2 - 2r_{21}(r_{a2} - r_{21})\frac{\alpha^2}{2}} \tag{33}$$

Finally, since $\alpha<1$, the second term in the radical of Equation (33) is considerably less than the first term, and we can with accuracy express it as a first order Taylor's series as:

$$r_b \approx r_{a2}\left(1 - r_{21}(r_{a2} - r_{21})\frac{\alpha^2}{2r_{a2}^2}\right). \tag{34}$$

Thus the reflectance after trimming is estimated as:

$$r_b \equiv r_{a2} - r_b \approx \left(r_{21}(r_{a2} - r_{21})\frac{\alpha^2}{2r_{a2}^2}\right). \tag{35}$$

From Equation (35) we find that the residual reflectance varies as the square of the angular thickness error, $\alpha$, where $\alpha$ is expressed in radians and is easily controlled to be much less than 1. Also $$\frac{r_{21}(r_{a2} - r_{21})}{2r_{a2}} < \frac{r_{a2}}{8}. \tag{36}$$

Furthermore, the power reflection is $|r_{after}|$ and this then varies as the fourth power of thickness error, which is indeed a small number.

Now FIG. 7 is considered. For simplicity, assume that $r_{21} = r_{1s} \gg r_{a2}$. Then it is quite easy to show that rafter is approximated by:

$$r_{after} = r_{21}\alpha \tag{37}$$

so that $r_{after}$ is dependent on $\alpha$ to the first power and $r_{21}$, which is assumed for this simplified problem to be much greater than $r_{a2}$. Therefore the final reflectance in FIG. 7 is much larger than that in FIG. 8 for the same thickness error. The important thing to realize is that the small (nearly zero) altitude triangle of FIG. 8 is the optimum phasor geometry for correction of inner layer thickness errors by trimming the outer layer. To obtain that optimum geometry it is necessary to find film indices that obey Equation (27). Because low loss, low scatter film materials that satisfy Equation (27) are not always available, suitable film materials can be made artificially by the effective index concept of alternating high and low index very thin films in correct thickness ratio to make the index needed as disclosed by Southwell and described above.

Southwell's effective index formula for the required thickness ratio of the EIL is then applied to the indices computed from Equation (27) or Equation (28). We can make both the inner and outer layer EIL's if desired, but Equation (28) shows that generally it is permissible, within reasonable limits, to choose $n_2$ and then compute $n_1$. Care must be taken to distinguish between a thin film and a thin film material. A material is defined by its atomic content (which results in an index of refraction) while a thin film is defined by both its refractive index and its thickness. A quasi-layer made up of many thin (e.g. 100 Å thick) layers of alternate materials is referred to as an EIL. The very thin layers making up the EIL may be called sublayers or EIL sublayers that may be used as described above to produce the desired multilayer structure. Regarding FIG. 8, it should be noted that the figure is in the complex plane with the real axis being horizontal and the imaginary axis being vertical.

The inner layer phasor, $r_{12}$, can be broken into two phasors whose resultant length is the same as $r_{12}$. The combined thickness of the two layers causes the resultant phase angle to be the same as for $r_{12}$. The effective index formula is thus extended to tri-periodic EIL's where three materials alternate cyclically.

Therefore, the method of the invention uses the effective index layer (EIL) layer method to artificially create a different index of refraction from what is already available. The EIL method is applied to multilayer antireflective coatings in which the outer layer is to be trimmed to achieve a very low reflectivity.

Although the invention has been described above with reference to specific preferred embodiments, it is intended that the invention shall be limited only by the appended claims.

What is claimed is:

1. An antireflective multilayer film formed on an optical substrate, the antireflective multilayer film comprising alternating layers of a first high refractive index material (62) chosen form the group consisting of titania, tantala, zirconia and hafnia, a layer (66) of alumina as a low refractive index material and an additional dielectric layer (68) comprising a material chosen from the group consisting of silica, tantala, zirconia and hafnia and an outermost layer (48) of a material chosen from the group consisting of alumina and silica, produced by a process that comprises the steps of:

determining an effective index of refraction for the multilayer film, the effective index of refraction having a reduced sensitivity to errors in thickness of the alternating layers and being correctable for the thickness errors by reducing the thickness of the outermost layer (48);

forming the antireflective multilayer film of more than two layers of the low and high refractive index material on the optical substrate, the layers having thickness ratios that provide the effective index of refraction and reduced sensitivity of the antireflective multilayer film with the outermost layer (48) having a thickness greater than its required thickness for antireflectivity; and reducing the thickness of the outermost layer (48) to compensate for total thickness error of both the outermost layer (48) and the alternating layers of the multilayer film to reduce the reflectivity of the multilayer film.

2. The antireflective multilayer film of claim 1 wherein the high refractive index material (62) and the additional dielectric layer (68) are formed of different materials.

3. The antireflective multilayer film of claim 1 wherein the high refractive index material (62) and the additional dielectric layer (68) are formed of different materials with the additional dielectric layer (68) having a refractive index that is lower than the refractive index of the high refractive index material (62).

4. A method for forming an antireflective multilayer film on an optical substrate, the antireflective multilayer film comprising alternating layers of a first high refractive index material (62) chosen form the group consisting of titania, tantala, zirconia and hafnia, a layer (66) of alumina as a low refractive index material and an additional dielectric layer (68) comprising a material chosen from the group consisting of silica, tantala, zirconia and hafnia and an outermost layer (48) of a material chosen from the group consisting of alumina and silica, comprising the steps of:

determining an effective index of refraction for the multilayer film, the effective index of refraction having a reduced sensitivity to errors in thickness of the alternating layers and being correctable for the thickness errors by reducing the thickness of the outermost alumina layer;

forming the antireflective multilayer film of more than two layers of the low and high refractive index material on the optical substrate, the layers having thickness ratios that provide the effective index of refraction and reduced sensitivity of the antireflective multilayer film with the outermost layer (48) having a thickness greater than its required thickness for antireflectivity; and reducing the thickness of the outermost layer (48) to compensate for total thickness error of both the outermost layer (48) and the alternating layers of the multilayer film to reduce the reflectivity of the multilayer film.

5. The method of claim 4 including the step of forming the high refractive index material (62) and the additional dielectric layer (68) are formed of different materials.

6. The method of claim 4 including the step of forming the high refractive index material (62) and the additional dielectric layer (68) are formed of different materials with the additional dielectric layer (68) having a refractive index that is lower than the refractive index of the high refractive index material (62).

* * * * *